Dec. 13, 1955     R. I. HAKOMAKI     2,726,706
HOT WIRE WELDER
Filed June 25, 1951
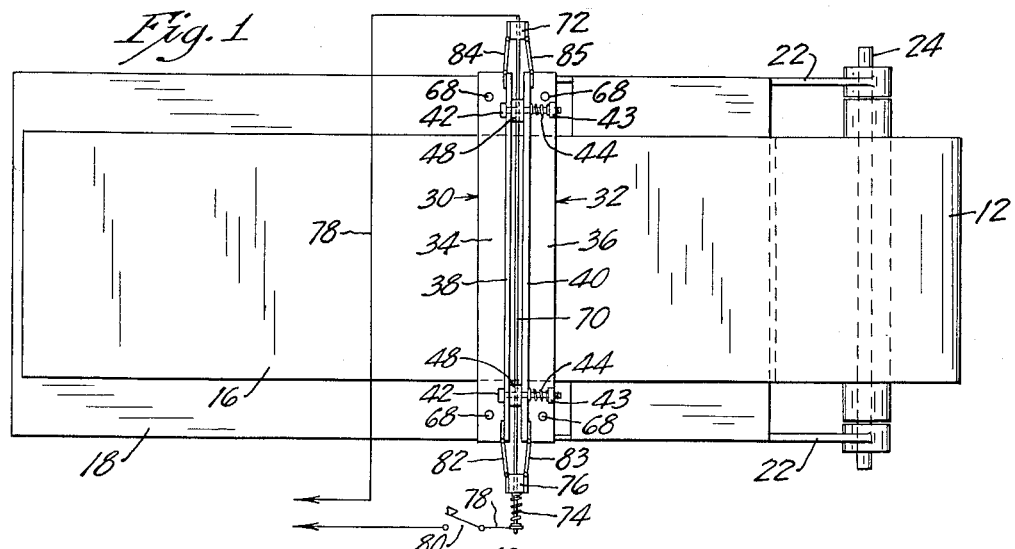
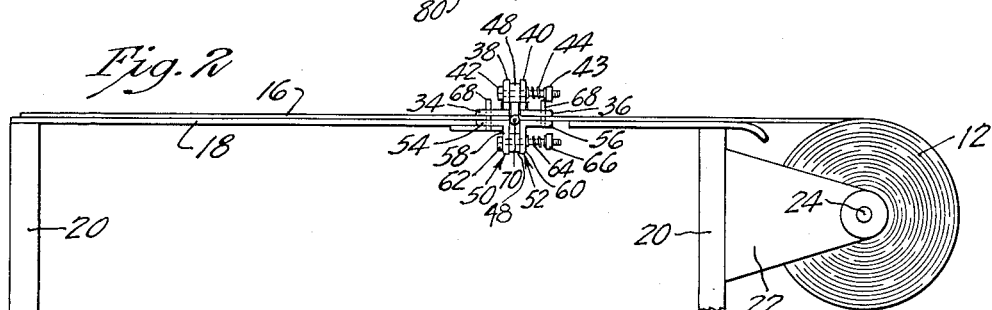
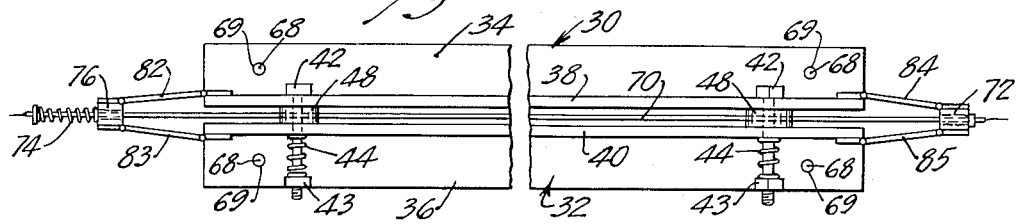
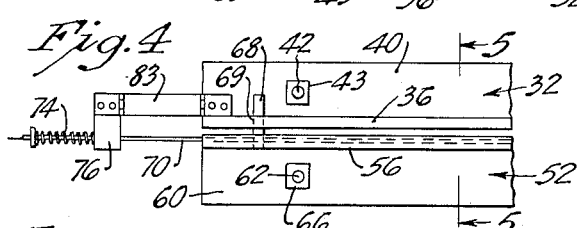
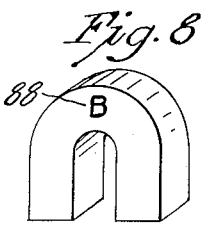
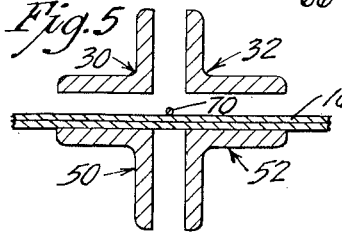
INVENTOR.
Raymond I. Hakomaki
BY William C. Stueber
ATTORNEY

United States Patent Office 2,726,706
Patented Dec. 13, 1955

2,726,706

HOT WIRE WELDER

Raymond I. Hakomaki, Minneapolis, Minn., assignor to General Mills, Inc., a corporation of Delaware Application June 25, 1951, Serial No. 233,449

5 Claims. (Cl. 154—42)

The present invention relates to improvements in devices for cutting thermoplastic sheet material and more specifically to a device for severing multiple layers of thermoplastic material and welding together the layers at the severed edge and to means for controlling the size and strength of the weld which is formed.

Devices for severing thermoplastic commonly use a heated severing member, such as a wire, for cutting the layers of material. The heated member is brought against the thermoplastic layers and the heat of the wire melts the material to cut it and fuses the edges of the material to form a seam and seal the layers at the edges. Difficulties are encountered in forming an even smooth seam of uniform strength. A mechanism which does obtain a smooth even seam often does not obtain the same high quality of seam for materials of different weights or thicknesses and therefore the mechanism either forms a crude seam or is suitable to one weight of material only. The present invention contemplates the solution of these problems among the following objects of the invention.

An object of the present invention is to provide a device for cutting and welding multiple layers of thermoplastic sheet material such as rubber hydrochloride, polyethylene and others, and which will accommodate various weights or thicknesses of material, welding the severed edges with a smooth even seam of uniform and optimum strength which is equally as strong as the sheet material adjacent the seams.

Another object of the invention is to provide a mechanism for severing and welding together the edges of multiple sheets of thermoplastic material, having a simple economically constructed device for securely clamping the multiple sheets of thermoplastic material with means to adjustably vary the spacing between the clamps to control the size of the weld bead which is formed.

A further object is to provide a set of clamps for clamping thermoplastic material having an adjustable space between them, in which a heated wire is located, and provided with a device which will insure that the wire will remain positioned at a point exactly intermediate the clamping means no matter to what space the gap between the clamping devices is adjusted.

Other objects and advantages will become apparent from the following specification taken in connection with the accompanying drawings, in which Figure 1 is a plan view of the mechanism for cutting and welding the thermoplastic material;

Fig. 2 is a side elevation showing the mechanism of Fig. 1;

Fig. 3 is an enlarged plan view illustrating the mechanism in detail;

Fig. 4 is a front elevation showing an enlarged view of one end of the mechanism;

Fig. 5 is a sectional view taken along line 5—5 of Fig 4;

Fig. 6 is a view showing the section of Fig. 5 with the upper clamping device moved down upon the material; and Figs. 7 and 8 are perspective views illustrating a unit from two groups of spacer members.

Referring to Figs. 1 and 2, the preferred embodiment of the invention is shown in operating position with a roll 12 of thermoplastic material, preferably polyethylene, feeding a sheet 16 of material into the cutting and sealing mechanism. The polyethylene material is preferably of the tubular type which is commercially available so that severing an end from the sheet and sealing together the edges will form facing sheets joined at their side edges to be used to form bags and other articles. Various other arrangements could be formed to join various numbers of sheets using separate layers of material of any number fed from a plurality of rolls, or the device could be used for cutting a single sheet. The feeding mechanism is mounted on a table 18 supported on vertical posts 20. The roll unrolls freely, being supported on brackets 22, in which the shaft 24, which supports the roll, is journaled.

The cutting and welding mechanism is comprised of an upper clamping assembly shown above the sheets 16 in Figs. 1 and 2 and a similar lower clamping assembly shown below the sheet of material. The upper clamping assembly is formed of a pair of clamping bars 30 and 32 which are formed of elements, such an angle irons, and have flat horizontal plates 34 and 36 flatly engaging the upper face of the sheet of thermoplastic. Attached at right angles to these horizontal plates, the clamping bars have upper vertical webs 38 and 40 through which holes are drilled at each end to accommodate bolts 42 which hold the bars in alignment. The holes in the left web 38, as pictured in Figs. 1 and 2, are such that the bolt fits snugly and the holes in the right web 40 permit sliding passage of the bolt therethrough.

Coil compression springs 44 are placed between the nut 43 on the bolt and the web 40 to urge the right clamping bar 32 toward the left bar 30. The distance between the members is fixed by the insertion of a U-shaped spacing piece 48 which is dropped in between the upper webs over each of the bolts 42. These U-shaped members, shown in Figs. 7 and 8, operate as spacers and fix the distance between the clamping members, which is critical.

The lower clamping assembly is constructed similar to the upper clamping assembly having a left clamping bar 50 and a right clamping bar 52, each having lower horizontal flat plates 54 and 56, respectively, and vertical web elements 58 and 60 attached at right angles to the plates. The assembly is supported by the plate 54 being secured to the table 18. Through the vertical webs 58 and 60 extend bolts 62 to hold the bars in alignment, being snug in the hole in the web 58 and loose for sliding in the hole in the web 60. Coil compression springs 64 abut between nuts 66 on the bolts and the web 60 to urge the clamping bars toward each other.

The space between the lower clamping bars is adjustably fixed by separate similar spacing members 48 which are slid between the vertical webs 58 and 60 of the clamping bars and over the bolts 62.

These spacing pieces come in sets, each unit of the set having a fixed thickness and the various sets being of different thicknesses, as illustrated by Figs. 7 and 8. The specific objective served by these sets will become apparent later in the specification.

It will be noticed from the drawings that the clamping members engage the polyethylene sheet material from opposite sides to hold it firmly therebetween. In order that the clamping members be positively aligned when clamped over the sheets, tapered bosses 68 project upwardly from the horizontal plates 54 and 56 of the lower clamping bars. The horizontal plates of the upper clamping bars are provided with mating boss receiving holes 69 which are slid over the projecting bosses. With the upper and lower clamping assemblies so aligned, the space between the opposing bars of the upper assembly will be directly opposite the space between the bars of the lower clamping assembly.

In order to sever and weld the thermoplastic sheets, a heated severing wire 70 is passed through the material in the space between the bars. The wire is supported by insulating members supported by the upper clamping bars. The wire is securely attached to the insulating member 72 on one end of the bars and attached to the outer end of a compression spring 74 which abuts the insulating member 76 at the other end. This insulating member has a passageway through the center through which the wire extends. Expansion and contraction of the wire, due to heating and cooling, is accommodated for by the spring 74 which always holds the wire taut.

Electrical leads 78 are attached to each end of the wire and lead through a manually closed contact switch 80 to a suitable source of electricity. This switch is closed when the clamping bars are in position and the cutting and sealing wire is held against the thermoplastic material thereby heating the wire to cause it to sever the sheets.

The insulating blocks at both ends of the clamping bars are supported on the upper clamping assembly in a manner shown in detail in Figs. 1, 3 and 4. A supporting arm 82 has its ends hingedly attached to the vertical web 38 of the clamping bar and is hingedly attached at its other end to the insulating block 76. Another supporting arm 83 is hingedly attached at its ends to the web 40 of the other bar and to the block 76. The insulating block 72 is similarly supported by arms 84 and 85 hingedly attached between the block and the webs 38 and 40. The arms form the sides of isosceles triangles and the insulating blocks at the apex will remain equi-distant from the bars for any position thereof and therefore the wire supported from the blocks will always be located directly in the center of the space between the clamping bars. The arms 82, 83 and 84, 85 are attached to the upper part of the blocks 76 and 72 respectively so that the wire in its normal position will be suspended below the flat surfaces of the horizontal plates 34 and 36. Since the upper and lower clamping assemblies are positioned above and below the thermoplastic material, the severing wire 70 will rest on the material directly between the bars of the clamping members, as shown in detail in Fig. 5. Then, as the upper clamping member is brought down tight against the thermoplastic, the wire will be held tightly against the upper surface of the material under tension of the spring 74. With the parts of the mechanism in this relative position, the contact switch 80 is briefly closed to heat the wire, causing it to melt the thermoplastic in contact therewith and pass through the layers of material.

In the preferred embodiment, the wire is positioned so that it will press against the upper layer of thermoplastic sheets when the clamping bars are engaging the material. It is to be understood, however, that the wire could be mounted on the lower clamping bars so that it engages the lower layer of material. The wire should not be positioned too far from the contacting face of the bars so that it will deform the material before the bars are lowered to contact position. In fact, the sealing wire will operate if it is merely brought adjacent the material and no contact is actually made. In this manner, the severing will be done by the radiant heat of the wire but, of course, the sealing process will take longer and the sealing bead may be more uneven in appearance.

The heat transmitted from the wire to the material melts the thermoplastic adjacent the area of contact causing it to fuse to form beads 86 at the severed edges which, after the wire is passed through, solidify to form a seam at the edges of the sheets, as shown in Fig. 6. It is to be understood that the figures show the material and beads greatly enlarged relative to the bars to more easily observe the cutting and welding action. When the heat is transmitted from the heated wire, it is conducted through the material to bring it to a temperature where the material will become molten. The excess heat is conducted away by the cool clamping bars, thus keeping the material between the clamping bars sufficiently cool that it will not become softened in that area. I have discovered that it is critical to obtain a certain distance between the cutting-welding wire and the cooling-clamping bars in order to achieve a smooth bead and to achieve a weld as strong as the adjoining material. The portion of thermoplastic which becomes liquid and fuses is controlled by the distance between the wire and the clamping bars, due to the rapid assimilation of heat from the material by the clamping bars in the area of contact between the bars and the sheets. If the distance between the heated wire and the clamping bars is increased, a larger area of material will become molten and a larger seam will be formed. Also, if the distance between the heated wire and the clamping bars is decreased, a less amount of thermoplastic will become molten and a smaller seam or bead will be formed. In addition, if the wire is too close to the bar for a given thickness of material, the seam may not be even and may not be fused in some places and if the wire is too far from the bar the seam will not be even and uniformly strong.

It is highly desirable that the seam formed at the severed edges of the layers of thermoplastic material be equal in strength to the material adjoining the seam. This will be true only when the size of the fused bead or seam is equal to the thickness of the adjoining thermoplastic material. Therefore, if the severing and sealing mechanism is to be used on thermoplastic material of various thicknesses or different gauge, seams of different sizes should be formed. The present invention will, by the use of only one sealing mechanism, accommodate material of different thicknesses, and the spacing between the clamping bars can be altered in accordance with the thickness of the sheets.

The spacing pieces 48 have labels 88 shown as A and B in Figs. 7 and 8. These labels indicate the thicknesses of the spacing pieces and correspond to different weights of material. If the operator intends to use the mechanism with a thermoplastic of a certain thickness, he selects the set of spacing pieces which has a thickness corresponding to that particular weight of material. The bars of the clamping members are then forced apart against the tension of the springs 44 and 64 and the spacing pieces removed and a proper piece is inserted over the bolts. The clamping bars will then be held apart by the spacing pieces a distance equal to the thickness of said pieces. When the apparatus is then used on the material the clamping bars are separated a proper distance and a weld bead of the proper diameter will be formed, thus gaining a seam of optimum strength.

No matter what spacing is set between the opposed bars of the clamping member, the severing wire 70 will always remain exactly between the bars due to the unique arrangement for supporting the wire. It is important that the wire be maintained exactly intermediate the two bars in order to obtain beads on the two edges of severed material of equal size and in order to prevent shorting of the uninsulated wire against the bars of the clamping bar.

With the use of the present mechanism for severing layers of thermoplastic material and welding the seams at the severed edges, the operator will be assured of always obtaining a smooth, strong and uniform welding bead. The material will always be seamed with a seam of a size which is proper for the thickness of thermoplastic used. Further, there need be no hesitancy in using the machine for materials of different thicknesses.

Thus it will be seen that I have provided an improved heat wire cutter for sealing and severing multiple sheets of thermoplastic material which presents numerous advantages and meets the objectives herein set forth.

I have, in the drawings and specification, presented a detailed disclosure of the preferred embodiment of my invention, but it is to be understood that as the invention is susceptible of modifications, structural changes and various applications of use within the spirit and scope of the invention, I do not intend to limit the invention to the specific form disclosed but intend to cover all modifications, changes and alternative constructions and methods falling within the scope of the principles taught by my invention.

I claim as my invention:

1. A device for cutting and welding layers of thermoplastic material comprising a first clamping means having spaced bars and means for adjustably fixing the distance between the bars, a second clamping means similarly constructed, a heated sealing wire for severing and welding the material, insulated blocks connected to the ends of said wire, a supporting arm hingedly connected between each insulated block and a bar of the first clamping means, and similar supporting arms hingedly connected between each insulated block and the other bar of the first clamping means to hold the wire at the midpoint between the bars as the distance between bars is varied.

2. A device for cutting and welding layers of thermoplastic material comprising a first clamping means having spaced clamping bars for holding the material flat and removing heat from the material and also having means for adjustably fixing the space between bars, a second clamping means similarly constructed having bosses projecting therefrom to enter the holes of the first clamping means and align the bars, a cutting and welding resistance wire connected to a suitable source of electricity, a contact switch controlling the supply of electricity to the wire, insulating blocks for supporting the wire, the wire being resiliently connected to at least one of said blocks, and arms hingedly connected to the insulating blocks and to said bars supporting the blocks with the wire between and below the bars to hold the wire equidistant from each of the bars of said first clamping means with variations in space between the bars upon operation of the spacing means.

3. A device for cutting and welding layers of thermoplastic material capable of accommodating material of different thicknesses comprising a first pair of straight edged bars spaced from each other and adapted to engage the material from one side, said bars adapted to conduct the heat away from the clamped material and being separated with the distance therebetween being adjustable, means connected to said first bars for varying the distance between the bars to thereby adjust the distance between the bar and the weld in the material and change the amount of heat conducted away from the weld, a second pair of bars similarly constructed and adapted to engage the material from the opposite side and adapted to conduct the heat away from the clamped material, means connected to the second pair of bars for varying the distance between the bars, a heated welding and severing means positioned between the first pair of bars to sever the material and form a bead to weld the severed edges, and means to support the heated welding and severing means in a position spaced substantially equidistant between said first pair of bars.

4. A device for cutting and welding layers of thermoplastic material comprising a pair of first spaced clamping bars engaging the material from one side and adapted to conduct the heat away from the material, a second pair of similar bars engaging the material from the opposing side and adapted to conduct the heat away from the material, means for varying the distance between the first clampnig bars, means for varying the distance between the second clamping bars, a heated cutting and welding wire located between the first bars, an insulated support tensioning the wire between the bars, and means to insure that the wire will remain substantially equally spaced between the first bars with variations of said distance between bars.

5. A device for cutting and welding layers of thermoplastic material comprising a first clamping member having a pair of bars to engage the material and adapted to conduct heat away from the material, means for varying the space between the bars, a second clamping member having a pair of bars adapted to conduct heat away from the material, means for varying the space between the bars, a heated sealing wire, means for mounting the wire equidistant from the bars of said first clamping member, and aligning means connected to one pair of bars and engageable with the other pair of bars insuring proper relative alignment of the first and second clamping members as they are brought together against the material and insuring that the sealing wire will be equidistant between the bars of the second clamping member as well as between the bars of the first clamping member.

References Cited in the file of this patent
UNITED STATES PATENTS

| | | |
|---|---|---|
| 2,488,212 | Lloyd | Nov. 15, 1949 |
| 2,524,584 | Zehr | Oct. 3, 1950 |
| 2,546,164 | Norris | Mar. 27, 1951 |
| 2,575,798 | Dain | Nov. 20, 1951 |
| 2,592,463 | Phillips | Apr. 8, 1952 |
| 2,627,213 | Nye | Feb. 3, 1953 |
| 2,665,738 | Caskin | Jan. 12, 1954 |
| 2,682,910 | Piazze | July 6, 1954 |